(12) United States Patent
Galbus et al.

(10) Patent No.: US 9,573,700 B2
(45) Date of Patent: Feb. 21, 2017

(54) FRANGIBLE COMPONENTS AND THEIR USE IN A SYSTEM FOR ENERGY ABSORPTION

(71) Applicant: Engineered Arresting Systems Corporation, Aston, PA (US)

(72) Inventors: Michael T. Galbus, Middletown, DE (US); Silvia C. Valentini, West Chester, PA (US); Hong Zou, Chadds Ford, PA (US); Youhong Li, Cherry Hill, NJ (US); G. Kent Thompson, Media, PA (US); Richard L. Orner, Jr., Oreland, PA (US); Yijian Shi, Swedesboro, NJ (US)

(73) Assignee: Engineered Arresting Systems Corporation, Aston, PA (US)

( * ) Notice: Subject to any disclaimer, the term of this patent is extended or adjusted under 35 U.S.C. 154(b) by 4 days.

(21) Appl. No.: 14/447,893

(22) Filed: Jul. 31, 2014

(65) Prior Publication Data

US 2015/0034439 A1 Feb. 5, 2015

Related U.S. Application Data

(60) Provisional application No. 61/860,313, filed on Jul. 31, 2013.

(51) Int. Cl.
*B64F 1/02* (2006.01)
*F16F 7/12* (2006.01)
*E01C 9/00* (2006.01)

(52) U.S. Cl.
CPC .............. *B64F 1/02* (2013.01); *B64F 1/025* (2013.01); *E01C 9/007* (2013.01); *F16F 7/12* (2013.01)

(58) Field of Classification Search
CPC .............. B64F 1/02; B64F 1/025; E01C 9/007; F16F 7/12
(Continued)

(56) References Cited

U.S. PATENT DOCUMENTS 1,839,015 A * 12/1931 Deveaux ........................ 293/136
3,251,076 A * 5/1966 Burke ............................ 428/116
(Continued)

FOREIGN PATENT DOCUMENTS

FR 2691124 A1 11/1993
FR 2756852 A1 6/1998
(Continued)

OTHER PUBLICATIONS

Machine translation in English for WO 9323626, Inventor: Pomero; 4 pages; Retrieve Date Jul. 2, 2015.*
(Continued)

*Primary Examiner* — Thomas J Williams
*Assistant Examiner* — Mariano Sy
(74) *Attorney, Agent, or Firm* — Kilpatrick Townsend & Stockton LLP; Dean W. Russell; Kristin M. Crall

(57) ABSTRACT

Embodiments of the present invention provide a core of individual components having properties such that a system assembled from the components absorbs the kinetic energy of a moving vehicle. The components may be interlocking components. The components may be manufactured of ceramic or polymeric composite or other materials that are strong enough to absorb the vehicle's energy and help stop the vehicle safely by the system's ability to crush or deform upon impact, and not so strong that it causes the vehicle to crumple against the barrier. In one particular embodiment, the components may be modified packing elements that are traditionally used in gas to liquid columns.

20 Claims, 7 Drawing Sheets

(58) Field of Classification Search
USPC ........ 188/377, 371; 256/13.1; 293/132, 133, 293/135; 196/187.01, 187.03; 404/6
See application file for complete search history.

(56) References Cited

U.S. PATENT DOCUMENTS

| | | | | |
|---|---|---|---|---|
| 3,339,673 | A * | 9/1967 | Schafer | 188/377 |
| 3,533,894 | A * | 10/1970 | Emerson et al. | 428/118 |
| 3,637,051 | A * | 1/1972 | Paine | F16F 7/157 188/268 |
| 4,008,915 | A * | 2/1977 | Walker | B60R 19/00 114/219 |
| 4,227,593 | A * | 10/1980 | Bricmont et al. | 188/377 |
| 4,352,484 | A * | 10/1982 | Gertz | E01F 15/146 104/254 |
| 4,666,130 | A * | 5/1987 | Denman et al. | 256/13.1 |
| 5,193,764 | A | 3/1993 | Larratt et al. | |
| 5,718,413 | A * | 2/1998 | Nagler | 256/13.1 |
| 5,746,419 | A * | 5/1998 | McFadden et al. | 267/140 |
| 6,347,790 | B1 * | 2/2002 | Nishibori | E01F 15/145 267/146 |
| 6,533,495 | B1 * | 3/2003 | Williams et al. | 404/6 |
| 8,336,933 | B2 * | 12/2012 | Nagwanshi et al. | 293/132 |
| 8,770,624 | B2 * | 7/2014 | Hollander | B60R 21/18 188/377 |
| 2004/0048027 | A1 * | 3/2004 | Hayes | B29C 67/0092 428/53 |
| 2004/0051321 | A1 * | 3/2004 | Hanai et al. | 293/132 |
| 2006/0011435 | A1 * | 1/2006 | Yamaki | F16F 7/124 188/376 |
| 2008/0120764 | A1 * | 5/2008 | Sajic | A41D 31/005 2/411 |
| 2009/0250675 | A1 | 10/2009 | Cashin et al. | |
| 2013/0020437 | A1 * | 1/2013 | Valentini | B64F 1/025 244/110 R |

FOREIGN PATENT DOCUMENTS

| | | |
|---|---|---|
| GB | 1092255 A | 11/1967 |
| WO | WO 9323626 A1 * | 11/1993 |

OTHER PUBLICATIONS

International Patent Application No. PCT/US2014/049052, International Search Report and Written Opinion dated Oct. 8, 2014, 13 pages.
International Patent Application No. PCT/US2014/049052, International Preliminary Report on Patentability dated Feb. 11, 2016.

* cited by examiner

FRANGIBLE COMPONENTS AND THEIR USE IN A SYSTEM FOR ENERGY ABSORPTION

CROSS REFERENCE TO RELATED APPLICATIONS

This application claims the benefit of U.S. Provisional Application Ser. No. 61/860,313, filed Jul. 31, 2013, titled "Arresting Beds for Vehicles," the entire contents of which are hereby incorporated by reference.

FIELD OF THE DISCLOSURE

Embodiments of the present disclosure relate generally to arresting systems that are used to decelerate vehicles, such as aircraft unable to stop on the available length of a runway.

BACKGROUND

Aircraft can and do overrun the ends of runways, raising the possibility of injury to passengers and destruction of or severe damage to the aircraft. Such overruns have occurred during aborted take-offs or while landing, with the aircraft traveling at speeds up to 80 knots. In order to minimize the hazards of overruns, the Federal Aviation Administration (FAA) generally requires a safety area of one thousand feet in length beyond the end of the runway. Although this safety area is now an FAA standard, many runways across the country were constructed prior to adoption of this standard. These runways may be situated such that water, roadways, or other obstacles prevent economical compliance with the one thousand foot overrun requirement.

In order to alleviate the severe consequences of overrun situations, several materials, including existing soil surfaces beyond the runway, have been assessed for their ability to decelerate aircraft. However, soil surfaces are not the best solution for arresting moving vehicles (i.e. aircraft), primarily because their properties are unpredictable.

Another system that has been explored is providing a vehicle arresting system or other compressible system that includes material or a barrier placed at the end of a runway that will predictably and reliably crush (or otherwise deform) under the pressure of aircraft wheels traveling off the end of the runway. The resistance provided by the compressible, low-strength material decelerates the aircraft and brings it to a stop within the confines of the overrun area. Specific examples of vehicle arresting systems are called Engineered Materials Arresting Systems (EMAS), and are now part of the U.S. airport design standards described in FAA Advisory Circular 150/5220-22B "Engineered Materials Arresting Systems (EMAS) for Aircraft Overruns" dated Sep. 30, 2005. EMAS and Runway Safety Area planning are guided by FAA Orders 5200.8 and 5200.9.

A compressible (or deformable) vehicle arresting system may also be placed on or in a roadway or pedestrian walkway (or elsewhere), for example, for purposes of decelerating vehicles or objects other than aircraft. They may be used to safely stop cars, trains, trucks, motorcycles, tractors, mopeds, bicycles, boats, or any other vehicles that may gain speed and careen out of control, and thus need to be safely stopped.

Some specific materials that have been considered for arresting vehicles (particularly in relation to arresting aircraft), include phenolic foams, cellular cement, foamed glass, and chemically bonded phosphate ceramic (CBPC). These materials can be formed as a shallow bed in an arrestor zone at the end of the runway. When a vehicle enters the arrestor zone, its wheels will sink into the material, which is designed to create an increase in drag load.

However, some of the materials that have been explored to date can be improved upon. For example, phenolic foam may be disadvantageous in that is has a "rebound" characteristic, resulting in return of some energy following compression. Cellular concrete has density and compressive strength properties that may vary with time and that could be difficult to maintain in production due to the innate properties of its variable raw materials and subsequent hydration process. A ceramic property is set to a stable state during firing process. Foamed glass can be difficult to control in uniformity. It is thus desirable to develop improved materials for vehicle arresting beds.

BRIEF SUMMARY

Embodiments described herein thus provide a core of individual frangible components having a compressive strength such that a system assembled from the components absorbs the kinetic energy of a moving vehicle. The components may be interlocking components. The system can be effective in stopping the vehicle by crushing and by absorbing the energy to prevent serious injury or death to the vehicle occupants. In other words, the components should be of a material that is strong enough to absorb the vehicle's energy and help stop the vehicle safely by the system's ability to crush or deform upon impact, and not so strong that it causes the vehicle to crumple against the barrier. The assembled system is intended to cause the vehicle to decelerate more slowly and to provide more cushion than a traditional rigid or non-crushable barrier.

In one particular embodiment, the components may be interlocking components that are modified ceramic or polymeric or metallic packing elements that are otherwise traditionally used in chemical, petrochemical and such industries (i.e. gas to liquid columns). Although various packing element shapes may be used, the packing elements provided by this disclosure may be modified to have the desired properties that allow them to be used for arresting vehicles.

There may be provided an energy absorbing system for arresting a vehicle, comprising a structure formed from a plurality of individual components with properties that (i) allow the components to crush upon impact with a moving vehicle and that (ii) minimize that effect of unconfined matter during vehicle engagement.

There may also be provided a method for using a plurality of components to arrest a vehicle, comprising: providing a plurality of components having a shape that allows the components to closely cooperate with other components; forming a core from a plurality of components such that the core remains confined from collective movement upon impact from a vehicle; positioning the core of components to arrest a vehicle.

DETAILED DESCRIPTION

Figure 1:
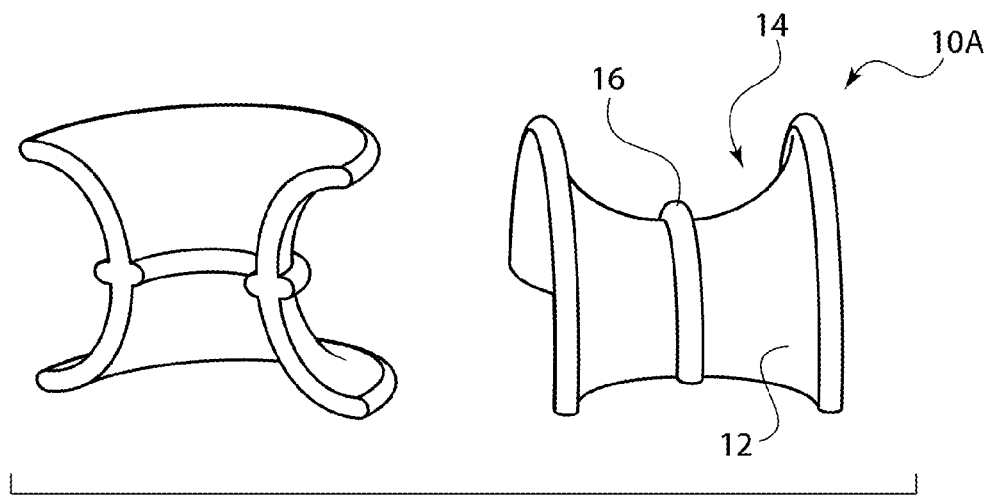
FIG. 1 shows a perspective view of one embodiment of a saddle-shaped packing component that may be manufactured with modified properties, geometries, and sizes that render it useful in a vehicle arresting zone.

Embodiments of the present disclosure provide improved materials for use in vehicle arresting systems. Improvements has been achieved through the modification of manufacturing processes, which include composition, porosity changes, and density changes. These changes are tailored to render a component or a plurality of components that can absorb energy upon impact, that remain in place upon impact, do not pose a high Foreign Object Debris (FOD) risk, and that are frangible or otherwise crush reliably. The materials may be used alone or they may be provided in a containment system, which may ease installation.

Specific embodiments provide an energy absorbing system that comprises a core of individual components that have a compressive strength that allows them to crush upon impact. The components may be interlocking components. The term "interlocking" as used herein may be used to mean that the components remain generally in a confined position when crushed and/or that they remain confined from collective or free movement in a certain direction. The term "interlocking" may refer to components configured to minimize that effect of unconfined matter during vehicle engagement. The term "interlocking" as used herein may be used to mean that the components have a shape such that, when the components are positioned or compiled in a group of a plurality of components, their shape causes them to loop, engage, interface, or otherwise generally secure to one another. A useful analogy may be to compare the components to a barrel of monkeys, wherein lifting one "monkey" generally causes its "arms" to interlock with another "monkey," but where it is also possible for one or more monkeys to fall off, with the "monkey" components still being considered "interlocking"

The term "interlocking" as used herein may be used to mean that the components have a shape such that when a plurality of components are positioned in a block or group, the components generally remain confined within the block or group when pressure is applied. The term "interlocking" as used herein may be used to mean that the components have a shape such that when a plurality of components are positioned in a block or group, they reliably break and/or crush with respect to one another and generally remain in their respective positions in the group, without creating a high degree of flying debris that projects from the group of components. The term "interlocking" as used herein may be used to refer to a plurality of components that closely cooperate with one another and do not appreciably shift upon application of pressure or force. The term "interlocking" as used herein may be used to refer to a component that has a traditional packing element shape. In a specific embodiment, the term "interlocking" as used herein may refer to a component that has a saddle-shape. In a specific embodiment, the term "interlocking" as used herein may refer to a component shaped as a partial arc. In a specific embodiment, the term "interlocking" as used herein may refer to a component shaped as a core body with protrusions that otherwise can secure with respect to another component. Further embodiments and additional details are provided below.

In one embodiment, the core material is comprised of individual interlocking components of various geometries and sizes or of components having the same geometry and size. The components may be manufactured from a ceramic, metallic or polymeric material or a combination. In another embodiment, the core may be a composite core that also includes other material that help achieve the energy absorbing properties desired. These other materials may be loose organic or inorganic materials that fill voids between the interlocking components or that aid in providing or forming a containment system. Other interlocking aids may be used. Non-limiting examples of other interlocking aids include glue, expanding foam, threading mechanisms, fibers, or combinations thereof. Other interlocking aids are possible and considered within the scope of this disclosure.

In one aspect, the present inventors explored various interlocking components or other products that could be compiled together into a composite core. Without wishing to be bound to any theory, it was believed that providing components that could securely interlock, stack, engage, cooperate, or otherwise fit together (albeit one or more voids therebetween may be provided) may provide a benefit of an assembly that has a gradient density or strength through the core system.

In a specific embodiment, the components used to form the arresting zones described herein may be random packing elements that are modified in material and density and other possible features. The shape of some random packing elements has been found to be useful in vehicle arresting zones (which is a use quite apart from their initial known or intended commercial use). This may be in part due to their ability to interlock and their ability to withstand pressure.

Random packing elements as component shapes. As background, random packing elements are typically used in gas to liquid columns to provide additional mass transfer surface area between a flowing liquid traveling down the column and an ascending vapor in the column. For example, packing elements are commonly used in distillation systems or columns that seek to separate oil from water and other components. The distillation tower is a series of distillation stages/processes stacked within one unit operation. Some levels of the tower may have sieve trays with openings that allow vapors to rise therethrough and channels that move the liquid from tray to tray down the tower. In use, a mixture/feed is heated under pressure to just below its boiling point. The pressure in the tower is lower than the pressure in the pre-heater, so when the mixture/feed enters the tower, it starts to boil. The vapors from the boiling liquid (which contain a lighter component than the mixture) rise up in the tower, and the liquid flows down to be drawn off.

Some types of towers (pack towers) contain trays with packing elements, which are provided to increase the surface area of the mixture/liquid to be boiled (so that it can boil with a lower applied temperature). The packing elements break up the liquid so that it flows over a large surface area. This exposes more of the liquid to rising vapors and increases heat transfer from the vapors to the liquid to maximize heat transfer. Typical packing elements are not suitable for use as energy absorbing; they are designed stronger with the purpose to withstand higher loads and pressure without breaking for years of use. Exemplary packing elements may be manufactured by Pollution Systems in Woodlands, Tex.; Kock Knight LLC in East Canton, Ohio; Koch-Glitsch, LP in Wichita, Kans.; Saint-Gobain in Paris; or AceChemPack Tower Packing Co., Ltd, in China. Any of the shapes of packing elements provided by any of these manufacturers may be used in connection with this disclosure. The properties (e.g. strength, density, failure mode, and performance) may be generally modified to be viable for energy absorbing applications One feature of some geometries of random packing elements is their interlocking nature. Each component interlocks with another component within the larger system. The interlocking mechanism ensures that the packing material is stable and does not move significantly when a liquid-gas transfer is occurring within the system. Packing stability is crucial to the overall performance of the column. Packing elements are also designed to withstand large loads of motive force, as well as the weight of the liquid and packing within the system. Specifically, the packing at the bottom of a tall structure is designed not to be crushed under the weight of the material above it. Strength for an individual piece or plurality of packing elements is not a critical parameter for the intended application in distillation columns, but they are generally designed with have high breaking strengths. For examples, the breaking strength range of packing elements ranges from about 200 to about 250 psi for commercially available ceramic packing elements.

Any shape of packing element may be modified as disclosed herein using the general parameters outlined. The following description and figures show some non-limiting examples of various packing element shapes that have been considered, modified, and found to be particularly useful. However, it should be understood that this description is provided to give examples only, and it is not intended to be limiting in any way.

Figure 2:
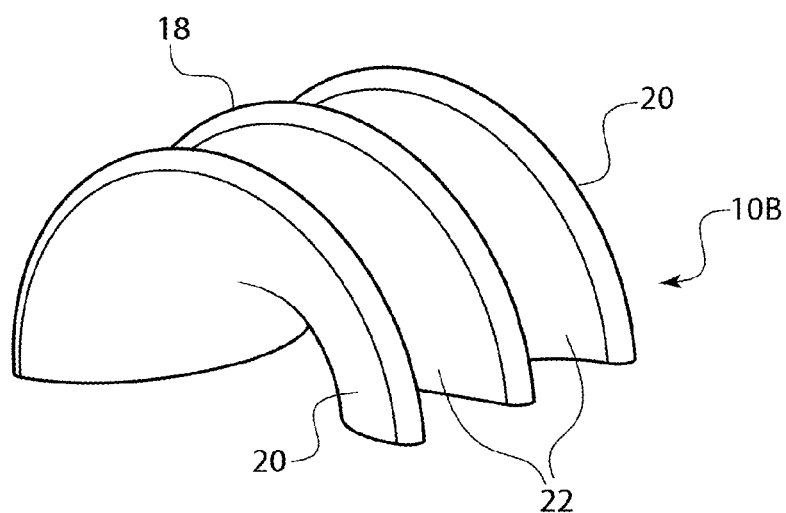
FIG. 2 shows a perspective view of an alternate embodiment of a saddle-shaped component with a ridge that may be manufactured with properties, geometries, and sizes that render it useful in a vehicle arresting zone.

FIG. 1 shows one example of a potential shape of a component that may be used for an individual interlocking component 10A. This component 10A may be used with or without one or more of the other components described herein. Component 10A is shown as having a bridge-like or saddle-like shape. For example, it may have a body 12 curved in a semi-circular arc with an indented or concave upper portion 14. Running along the concave upper portion 14 may be a raised ridge 16. The raised ridge 16 in FIG. 1 is shown as a slight bump that runs the length of the upper portion 14. FIG. 2 shows an alternate component 10B, which has a center ridge 18 that separates outer saddle walls 20 from one another. This component 10B may be used with or without one or more of the other components described herein. Center ridge 18 may be the same or similar height as the outer saddle walls 20, dividing the component into two concave upper portions 22. The center ridge 18 may add strength to each individual piece, aid in interlocking and increasing mass, aid in reducing void fraction, and aid in improving energy absorption capabilities of the overall body.

Figure 3:
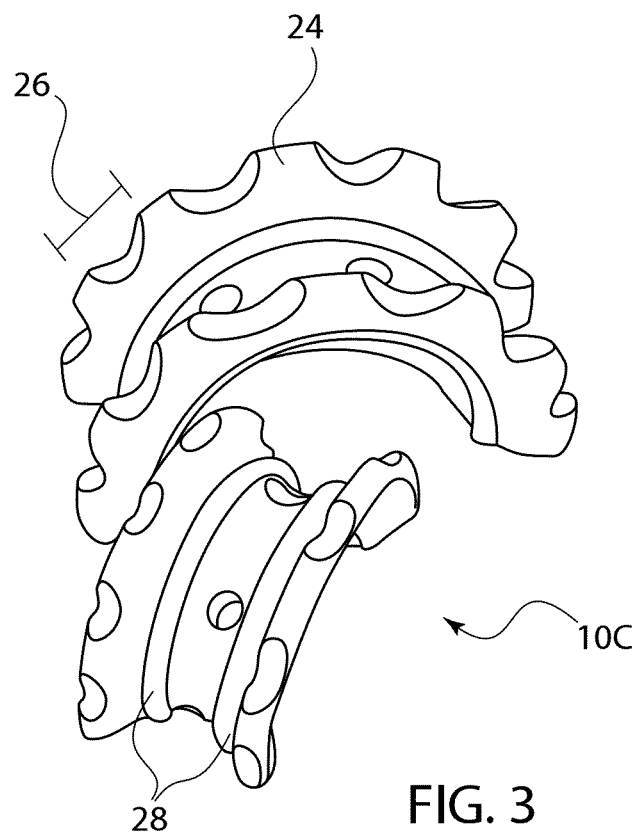
FIG. 3 shows a perspective view of further embodiment of a saddle-shaped component with scalloped walls that may be manufactured with properties, geometries, and sizes that render it useful in a vehicle arresting zone.

FIG. 3 shows a further embodiment for component 10C. This component 10C may be used with or without one or more of the other components described herein. Component 10C has "ruffled," scalloped, or undulating outer saddle walls 24. The inter-scallop distance 26 may be altered as desired. Component 10C also has two ribs 28 extending along its upper concave portion.

Figure 4:
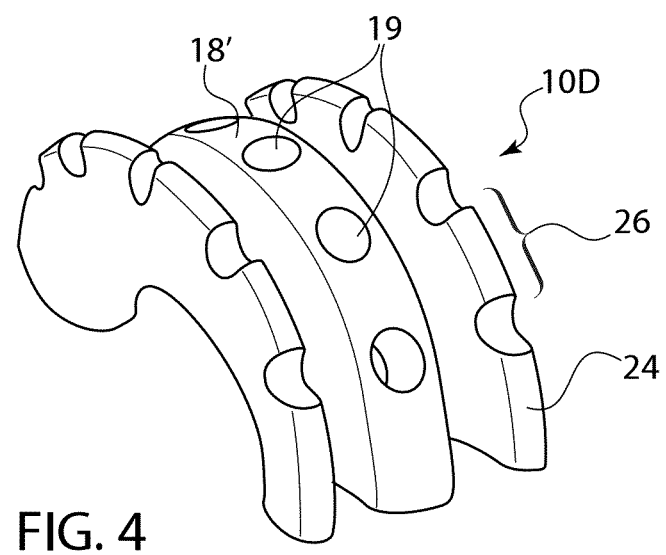
FIG. 4 shows a perspective view of a further embodiment of a saddle-shaped component with scalloped walls and a ridge wall that may be manufactured with properties, geometries, and sizes that render it useful in a vehicle arresting zone.

A further saddle-shaped component 10D is shown in FIG. 4. This component 10D may be used with or without one or more of the other components described herein. Component 10D is shown having a center ridge 18' with a series of apertures 19 therein. This center ridge 18' is shown having a greater width than the ridge 18 of FIG. 2. Component 10D also has scalloped outer saddle walls 24. The inter-scallop distance 26 may be altered as desired to help interlocking properties as components are put into contact with one another. This distance 26 may also help to break components easier.

Figure 5A:
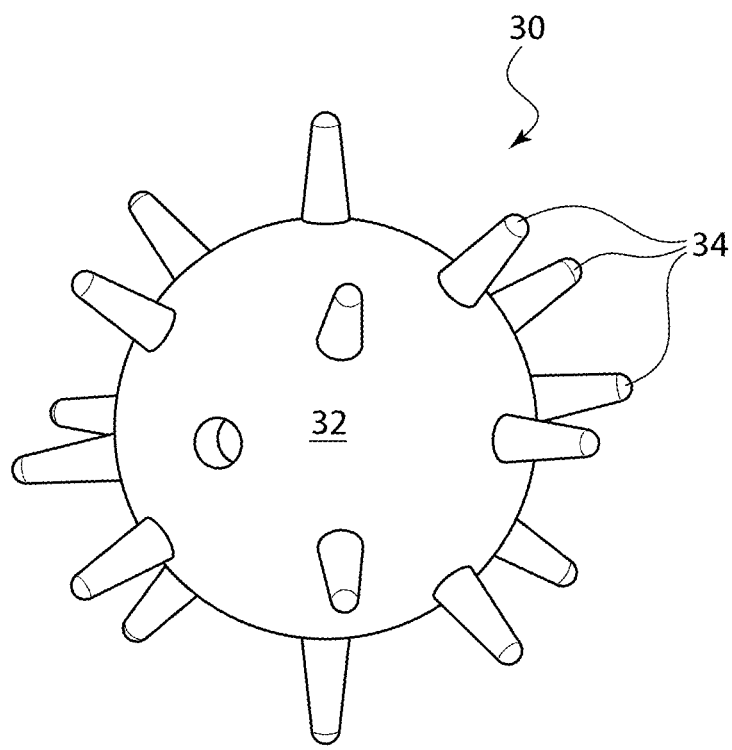
FIG. 5A shows a perspective view of one embodiment of a spherically-shaped component that may be manufactured with properties, geometries, and sizes that render it useful in a vehicle arresting zone.

FIG. 5A shows an alternate embodiment of a component 30 that may be used. This component 30 may be used with or without one or more of the other components described herein. Component 30 is shown having a generally spherical body 32 with one or more protrusions 34. The protrusions 34 may be spikes, nubs, fingers, or any other shaped structure that is raised up from the spherical body 32. The protrusions may help improve interlocking interaction of component 30 with other components. The protrusions 34 may be of any length. In one specific embodiment, the protrusions 34 have a length that is generally less than the diameter of the spherical body 32, although they may extend longer if desired.

Figure 5B:
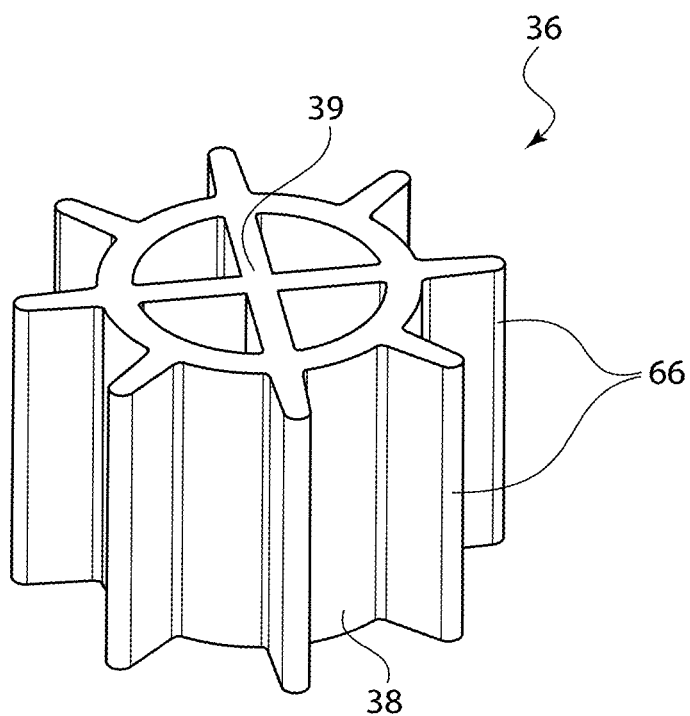
FIG. 5B shows a perspective view of one embodiment of a tubular-shaped component with protrusions for interlocking that may be manufactured with properties, geometries, and sizes that render it useful in a vehicle arresting zone.

FIG. 5B shows an alternate embodiment of a component 36 that may be used. This component 36 may be used with or without one or more of the other components described herein. Component 36 is shown having a circumferential/tubular body 38 with a hollow diameter. Within the hollow diameter may be an inner shape 39 that may be provided to help support the body 38. FIG. 5B shows the inner shape 39 as being a cross or "x" or "t", but it should be understood that the inner shape 39 may be any appropriate connection across the walls of the tubular body 38 that may lend support upon a crush or pressure. Extending from the body 38 may be extensions 66. Extensions 66 may assist with interlocking aspects.

Figure 6:
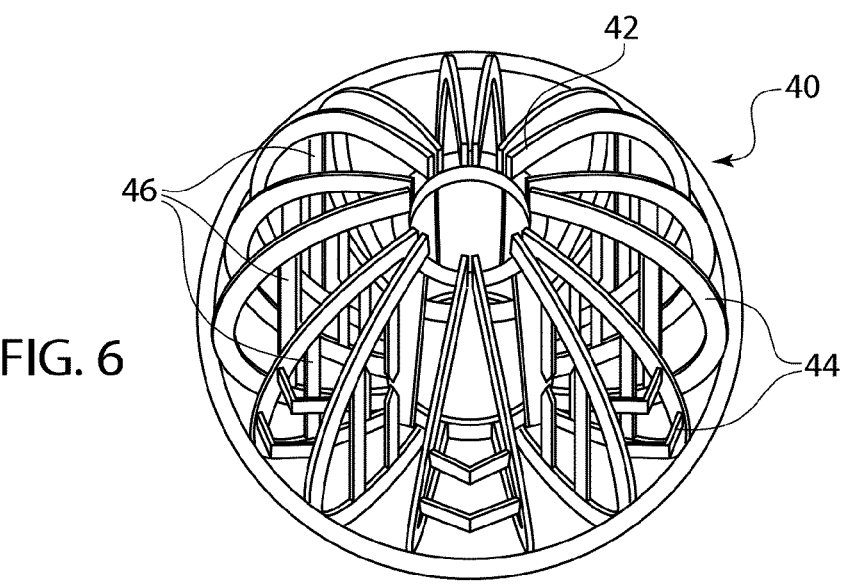
FIG. 6 shows a perspective view of one embodiment of a spherically-shaped component that may be manufactured with properties, geometries, and sizes that render it useful in a vehicle arresting zone.

FIG. 6 shows a further embodiment of a component 40 that may be used. This component 40 may be used with or without one or more of the other components described herein. Component 40 is shown having an outer spherical body 42 that is formed by a series of curved supports 44. The curved supports 44 themselves may be supported by interior extensions 46.

Figure 7:
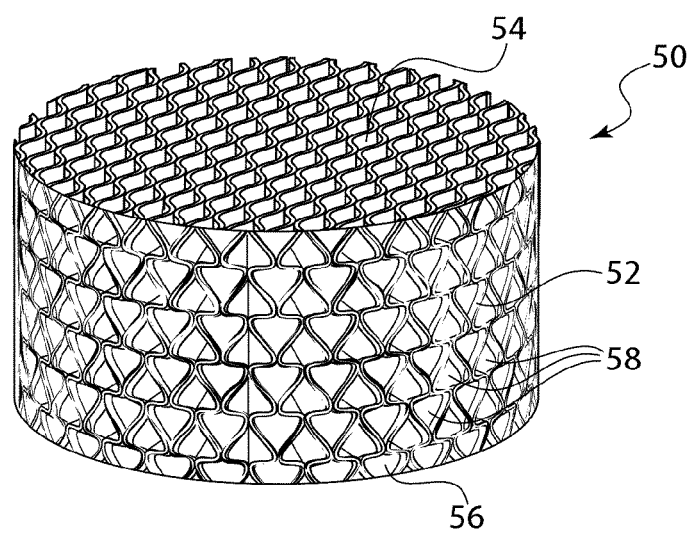
FIG. 7 shows a perspective view of one embodiment of a grid or lattice-shaped component that may be manufactured with properties, geometries, and sizes that render it useful in a vehicle arresting zone.

In a further embodiment, the component maybe provided as a lattice component 50 as shown in FIG. 7. This component 50 may be used with or without one or more of the other components described herein. FIG. 7 shows a plurality of lattice components 50 forming a core. A lattice component 50 may have undulating strips 52 extending from an upper portion 54 to a lower portion 56 of the component 50. The undulating strips 52 have interstices/space 58 therebetween. The components 50 may not interlock, but may be set into place during manufacturing. The core block structure shown, however, may be interlocked among different core blocks when put together in a volume. The components 50 of FIG. 7 may be configured such that the system is isotropic in nature (i.e. by intentionally changing the orientation of each individual piece.) The interlocking mechanism may be achieved by the inherent shape or by threading or gluing or any other connecting measures as deemed necessary.

Figure 8:
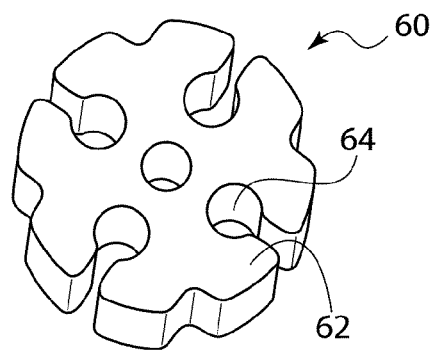
FIG. 8 shows a perspective view of one embodiment of a snowflake-shaped component that may be manufactured with properties, geometries, and sizes that render it useful in a vehicle arresting zone.

Another example of a component 60 that may be used with this disclosure is shown in FIG. 8. This component 60 may be used with or without one or more of the other components described herein. Component 60 may be provided as a snow-flake like shaped component 60. This component 60 has extending arms 62 that may make any shape. The arms 62 border openings 64 that create space in the component shape 60.

Other examples of potential components and component shapes that may be used with this disclosure are shown in the composite formed cores shown in FIGS. 9-12. These figures illustrate possible configurations of saddle-shaped components, curved undulating egg-crate like components in a lasagna-type assembly, noodle-shaped elements in a core, and S-shaped elements in a core. Any of these components may be used with or without one or more of the other components described herein.

In general, the interlocking nature of the designed components prevents the components from slipping, shifting positions or moving aside when they interact with an aircraft wheel, in an arrestment situation. In this way, there is little momentum transfer. Even in the components designed as undulating plates or "lasagna block style," the interlocking may occur by the shear position of such plates forming the blocks, and then shifting position of blocks to make the unit system isotropic.

As a non-limiting example, any of the above components may range in size from about ⅛ to about 6 inches. Components as large as 12 or even 16 inches may be used. Components as small as 1/16 inch may be used. As outlined below, the materials and system are designed and manufactured for arresting aircraft and other vehicles. Other material intrinsic properties, such as density interlocking mode, size, and geometry may be modified to meet the needed energy absorbing properties.

Although a few options for component shapes have been shown, it should be understood that other shapes may be used and are considered within the scope of this disclosure. The general intent is to provide structures or components that lock and provide energy absorbing features due to the interlock. It has been found that saddle-shaped components provide a lock that allows them to behave as energy absorbing. It should be understood that other shapes or a combination of several different shapes, sizes, and physical properties may be applicable to many different scenarios, and can be modified as needed.

Properties. Applicants have determined that modifying the materials of some of the above-referenced shapes can render them useful in vehicle arresting zones or beds. It is generally desirable that the compressive strength and density of the modified components be such that the components, once assembled into a system, function as desired. They may thus be made of a density and compressive strength that allows the assembled system to reliably break and crush upon impact, without creating large amounts of debris projecting from the crushed system. Various parameters may be modified, such as changes in the process set points, raw material composition used and reactivity, particle size distribution of each, void ratios, lightweight additives, porosity, and burnable components.

In one particular embodiment, the interlocking components may be made of a ceramic material. The ceramic material may be a crystalline ceramic or a non-crystalline ceramic or a composite. For example, it may be glassy or crystalline in nature, porous, and have a superlight weight. Possible materials also include but are not limited to: earthenware, stoneware, porcelain, oxides (such as alumina, beryllia, ceria, zirconia), nonoxides (such as carbide, boride, nitride, silicide), or composite materials (such as particulate reinforced, fiber reinforced, combinations of oxides and nonoxides). The raw materials that may be used may include ceramics which are primarily inorganic, which in turn can reduce the risk of combustion under fire conditions. Plastic (such as, polypropylene, fluorocarbons, and other various plastics) with the addition of the appropriate flame retardants may be utilized as well. Metals, such as aluminum, are also possible materials for use. In addition, a composite made of any or all of the above in a single element or in a system may be an appropriate material of construction.

The overall material properties that are generally provided are low density, a brittle/crushable component, and strength requirements that match an existing strength profile of vehicle arresting beds. In one embodiment, they may have a compression strength of less than about 150 psi (pounds per square inch). In one embodiment, they may have a compression strength of less than about 100 psi (pounds per square inch). In one embodiment, the compression strength of each individual component that forms the core of the system may range from about 5 to about 125 psi.

In one embodiment, a density range for a plurality of components may be about 2 to about 50 pounds per cubic foot. In one embodiment, a set of a plurality of components may have a density of less than about 50 pounds per cubic foot. In one embodiment, each individual component may have a density range of about 5 to about 150 pounds per cubic foot. In other embodiments, each individual component may have a density of less than about 30 pounds/cubic foot.

In one embodiment, each individual component may have a porosity of around 50% Bulk Density. In one embodiment, each individual component may have a porosity of about 60-80%.

The final system may have a predetermined compressive gradient strength (CGS) such that a vehicle striking the system is subjected to drag forces effective to slow it down, providing deceleration within a safe range of values. Other properties may be provided that allow the final system to provide the desired arresting function. Accordingly, although the shapes of the components described are useful, the materials of the elements may be modified as described in order to provide the most optimal vehicle arresting system. In one aspect, the components for use in this disclosure are designed to crush under less weight than traditional packing elements. The components for use in this disclosure may also be designed to pulverize into small particles upon impact. The failure mode desired in an arrestment system is such that the material may be reduced to small brittle pieces, such that if/when they fly away from the site of impact, they do not represent FOD (foreign object damage) at an airport.

It should be understood that the material type, density, porosity, composition, nature of its material, composite void fraction, and other features of the individual components, and bulk density and compressive properties of the system may change depending upon the intended velocity, mass, and direction of travel of the vehicle. These parameters may also change depending upon where and how the system is installed.

Formation of arresting bed structure. In use, the individual components may generally be interlocked or otherwise configured to form a larger structure 70, examples of which are shown in FIGS. 9-12. These structures can be modeled based upon the different types of vehicles and the characteristics of the vehicle to be arrested. In addition, the model may take into account the available space and the speed of the vehicle entering the system. The system may be modeled/designed based upon the vehicle/object characteristics. For example, design, shape, size, component proportions, and the degree of interlocking (as well as other parameters) may be tailored to the precise application. The overall system performance is generally isotropic in nature.

In one embodiment, the interlocking components may be formed into a mold or containment system. In another embodiment, the interlocking components may be glued to one another without an outer mold or containment system. In another embodiment, the interlocking components may be left in their individual forms and installed in a cavity in the ground.

For example, a containment system may be provided in the form of a box having a base and outer walls. The general goal is to provide a perimeter in which the interlocking elements can be positioned for containment. If used, the containment system may be anchored above ground or installed below ground. The anchoring system may include rigid or flexible pins or an adhesive that is applied between the bottom of the containment system and the ground.

Figure 9:
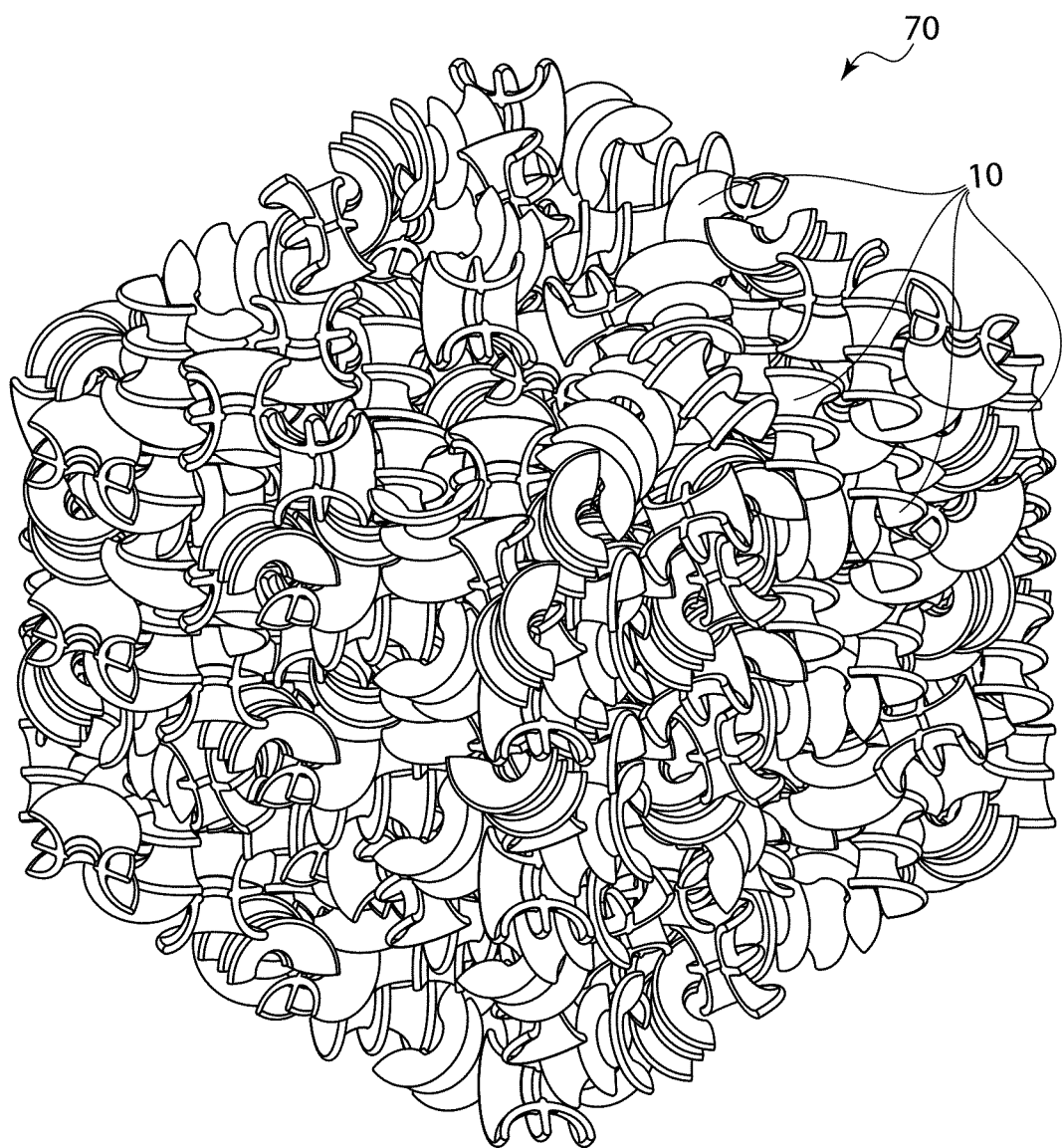
FIG. 9 shows a perspective view of a composite core manufactured from a plurality of saddle-shaped components that have been be manufactured with properties, geometries, and sizes that render them useful in a vehicle arresting zone. The saddle-shaped components may be lose or adhered to one another using an adhesive to further improve interlocking.
Figure 10:
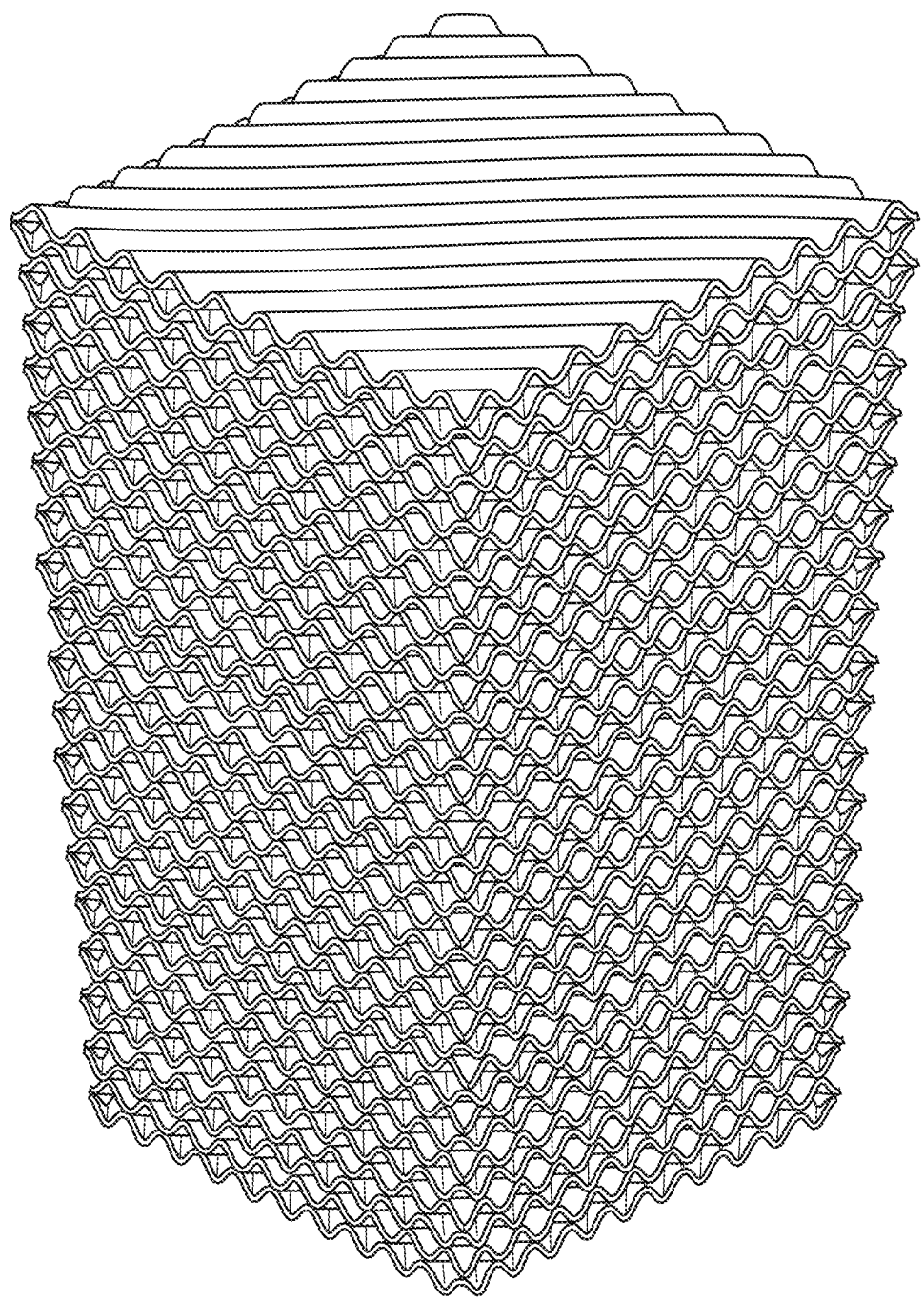
FIG. 10 shows a perspective view of a composite core manufactured from a lasagna-like layering of undulating ridged components that have been manufactured with properties, geometries, and sizes that render them useful in a vehicle arresting zone.
Figure 11:
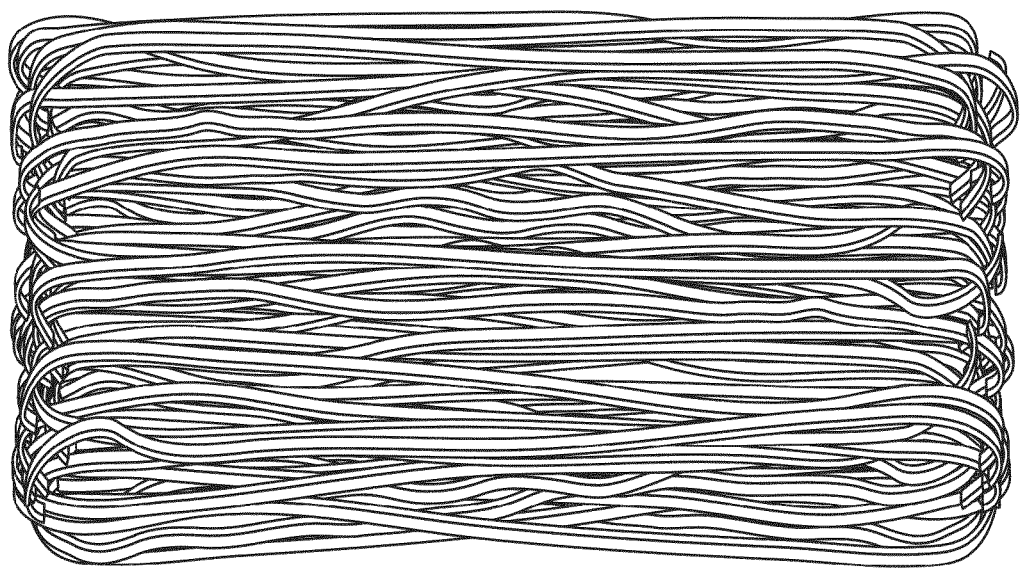
FIG. 11 shows a perspective view of a composite core manufactured from a series of noodle-like components that have been be manufactured with properties, geometries, and sizes that render them useful in a vehicle arresting zone.
Figure 12:
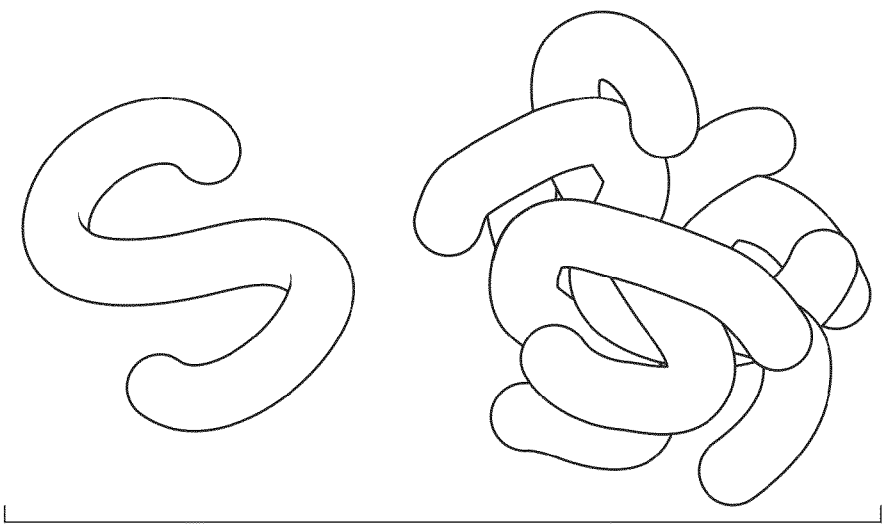
FIG. 12 shows a perspective view of a composite core manufactured from S-shaped components that have been be manufactured with properties, geometries, and sizes that render them useful in a vehicle arresting zone.

As another example, the interlocking components may be glued or otherwise adhered to one another to form a composite core. One example of this embodiment is shown in FIG. 9. This figure shows a plurality of saddle-shaped components 10 that have been interlocked and glued to form a structure 70. Each saddle component interlocks with other saddle components due its curled irregular shape and/or due to their placement at random into a box or container. Other shapes can be intermingled to either reducing interlocking, or to increase interlocking. For example, FIG. 10 shows a lasagna-type undulating structure. The components are interlocked due to the nature of their undulating features that abut one another. For example, FIG. 11 shows needle or noodle shaped components that are interlocked due to the nature of their tangled structures. For example, FIG. 12 shows S-shaped components that are interlocked due to hooking of curved portions of one component to curved portions of another component. Surface roughness of one of more of the components described herein may also assist in the interlocking function.

The components may be further secured together using any appropriate adhesive, if desired, to increase "lock in place of body." Examples include but are not limited to a ceramic glaze, organic glue, foamed polymers, foils, or combinations thereof. It is possible to add any desired material that may improve the function of the final system. For example, one or more components to prevent moisture intrusion may be added. Additionally or alternatively, one or more components to support top weight to distribute the load of a pedestrian without breaking may be added.

The system may be preassembled at an offsite location or may be assembled in place at the final location. In either case, materials are set in a small area to form several smaller subsystems (i.e. blocks) or can be monolithic in nature. In the case of manufacturing offsite, the blocks may be transferred to the final location and installed in place. Installation methods and system protection will depend upon the specific requirements of the energy absorption application, as well as the environment in which the subsystem or system will be installed. For example, if the energy absorption application is a wall, then the system could be protected with off the shelf construction materials.

Another method of securing the interlocking components to one another in order to form a structure may be to include tying the components in bundles, threading them together, forming them with specific interlocking structures, or any other appropriate connection method. These methods may further improve locking characteristics and reduce interspace voids, which can in turn improve energy absorbing properties of the system.

As another example, a depression in the ground may be formed at the desired location, and the interlocking components may be positioned in the depression. This option may be used with or without a containment system. This option may also be used with or without adhering the components to one another.

In any of the above embodiments, additional materials may be added to fill the interstices/voids between the interlocking components. For example, loose organic or inorganic materials may be used to fill voids. Non-limiting examples of potential components that may be added to the composite core include (but are not limited to) such as sand, foam, gravel, adhesive, cellular concrete, CBPC, fibers, scrim or netting strips, fabric, threads passing through the components, and any combination thereof.

In any of the above embodiments, the orientation of the product may be such that it is self-draining. The shear characteristic of the materials when assembled may be an open cell structure. Thus, if water intrudes, it will have paths to flow out of the system.

In summary, there is provided a vehicle arresting zone system with interlocking components that have the desired compression, density, porosity, and other characteristics. Due to the interlocking nature of the components, the resulting system is stable and minimizes the amount of energy absorption from momentum transfer. Instead, the main component of energy absorption will be from the breaking and crushing of the materials within the system. Minimization of momentum transfer (i.e., pieces moving due to the impact of the vehicle) is beneficial from a safety and reliability standpoint.

As used herein, the term "vehicle" is intended to mean any mechanical structure the moves via wheels and/or belts. The term includes aircraft, trucks, motorcycles, bicycles, water vessels, and others. As used herein, the term "arrestor zone" or "arresting zone" is intended to mean any depression or container that may be used to hold the desired arresting material. In one embodiment, the zone may be formed as a depression or cavity formed in the ground. The depression may be formed by removing earth volume and filling the depression with the desired material. Alternatively, the depression may be lined with a perimeter of other material. In another embodiment, the zone may be formed from a container-type or other mechanical structure with walls that are designed to hold the desired arresting material above ground, either with or without a depression or cavity formed in the ground level. In another embodiment, there may be a ramp or other structure leading to the zone of material and/or the ramp or other structure may also be formed of the arresting material that is used to fill the arresting bed/zone.

The dimensions of the arrestor zone that is provided will depend upon the dimensions of the vehicle to be stopped. For example, the dimensions may depend upon the expected vehicle velocity and/or mass. The length, width, and depth of the arrestor zone may be varied as appropriate. The general goal is that the wheels of the vehicle to be stopped will sink a distance into the arrestor material in order to create a drag force in order to absorb energy and decelerate the vehicle. The energy absorbing capacity may vary with the number of components used, their shapes, sizes, individual physical and mechanical properties, and so forth. Specifically, the greater the number of components, the greater the energy absorbing capacity. Energy absorbing capacity may also be varied by the type of adhesive or containment system used to form the core. Energy absorbing capacity may also be varied based on the compressive strength, density, porosity of the individual components, and/or the void fraction of the body. Certain shapes may compact more than others after interlocking in a set volume, thus rendering different body properties. Energy absorbing capacity may also be varied based on materials that may be used to fill voids between components.

Changes and modifications, additions and deletions may be made to the structures and methods recited above and shown in the drawings without departing from the scope or spirit of the invention and the following claims.

What is claimed is:

1. An energy absorbing system for arresting a vehicle, comprising:
   a crushable barrier structure formed from a plurality of individual brittle components, the plurality of individual brittle components packed at random and providing an isotropic energy absorbing system, wherein the plurality of individual brittle components are interlocking components interlocked to one another and shaped as a partial arc, have arm protrusions that secure with respect to another component, or both,
   wherein the components are formed of a material that pulverizes under the weight of wheels of an overrun aircraft; and
   wherein airborne debris during vehicle engagement is minimized due to interlocking, pulverization, or both.

2. The system of claim 1, wherein the brittle components comprise shapes that generally restrict the components from free movement with respect to one another.

3. The system of claim 1, wherein the plurality of individual brittle components remain confined from collective movement or projection during vehicle arresting.

4. The system of claim 1, wherein the brittle components are assembled such that one or more voids are present between the components.

5. The system of claim 1, wherein the brittle components comprise ceramic, polymeric material, composite material, metal, or any combination thereof.

6. The system of claim 1, wherein the brittle components are saddle-shaped, S-shaped, tangled noodle shaped, or combinations thereof.

7. The system of claim 1, wherein the brittle components comprise single or varied sizes.

8. The system of claim 1, wherein the structure further comprises one or more additional material types to fill voids between brittle components.

9. The system of claim 8, wherein the additional material types adhere to the brittle components.

10. The system of claim 8, wherein the one or more additional material types comprise sand, foam, gravel, adhesive, polymeric foam, cellular concrete, CBPC, fibers, scrim or netting strips, fabrics, threads passing through the components, or combinations thereof.

11. The system of claim 1, wherein the brittle components are formed into a composite core structure using an adhesive for further securing the brittle components to one another.

12. The system of claim 1, wherein the brittle components comprise modified packing elements manufactured of materials that have a lesser compressive strength less than 100 psi.

13. The system of claim 1, wherein the brittle components have a density of less than about 150 pounds per cubic foot.

14. The system of claim 1, wherein the brittle components have a compression strength ranging from 5 to 125 psi.

15. The system of claim 1, wherein the system has a compression gradient strength that is less than about 150 pounds per square inch.

16. A method of using a plurality of components to arrest a vehicle, comprising:
   (a) providing a plurality of brittle components having a shape that allows the brittle components to closely cooperate with other brittle components such that the plurality of brittle components are randomly packed into an at least partially interlocking isotropic system, wherein the plurality of brittle components comprising interlocking components interlocked to one another and shaped as a partial arc, have arm protrusions that secure with respect to another component, or both;
   (b) forming a crushable barrier core from the plurality of brittle components such that the core remains confined from collective movement upon impact from a vehicle;
   (c) positioning the crushable barrier core of the plurality of brittle components to arrest an overrun vehicle via engagement of the core with wheels of the vehicle.

17. The method of claim 16, wherein the plurality of brittle components are similarly-shaped and sized.

18. The method of claim 16, wherein the plurality of brittle components have different shapes and sizes.

19. The method of claim 16, wherein the plurality of brittle components comprise ceramic, polymeric material, composite material, metal, of any combination thereof.

20. The method of claim 16, wherein the plurality of brittle components are saddle-shaped, S-shaped, tangled noodle shaped, or combinations thereof.

* * * * *